United States Patent [19]

Sato et al.

[11] 4,324,993
[45] Apr. 13, 1982

[54] COOLING MEDIUM BAFFLING DEVICE IN ROTARY ELECTRIC MACHINE

[75] Inventors: Masaki Sato; Hironori Okuda; Motoya Ito; Yuji Makino, all of Hitachi, Japan

[73] Assignee: Hitachi, Ltd., Tokyo, Japan

[21] Appl. No.: 847,157

[22] Filed: Oct. 31, 1977

[30] Foreign Application Priority Data

Nov. 5, 1976 [JP] Japan ............................... 51/132855

[51] Int. Cl.³ .............................................. H02K 9/00
[52] U.S. Cl. ....................................... 310/58; 310/64; 310/208; 310/260
[58] Field of Search ........................ 310/64, 65, 52, 58, 310/59, 55, 62, 63, 256, 260, 208, 91, 188

[56] References Cited

U.S. PATENT DOCUMENTS

| 2,653,255 | 9/1953 | Baudry | 310/64 |
| 3,413,499 | 11/1968 | Barton | 310/64 |
| 3,731,127 | 5/1973 | Harrington | 310/256 |
| 3,739,208 | 6/1973 | Shartrand | 310/64 |
| 3,886,387 | 5/1975 | Graham | 310/256 |
| 4,051,400 | 9/1977 | Armor | 310/58 |

Primary Examiner—R. Skudy
Attorney, Agent, or Firm—Craig and Antonelli

[57] ABSTRACT

In a rotary electric machine including a stator core and a stator winding received in slots of the stator core, a cooling medium baffling device is provided which comprises a cooling medium baffle plate fixed to the inner peripheral edge of one end of the stator core by mounting bolts protruding axially from the end of the stator core, wherein the circumferential position of each of the mounting bolts is displaced from the circumferential position defining the boundary between the different modes of phase currents flowing through the coils constituting the stator winding, thereby effectively eliminating generation of excessive heat due to excessive eddy current losses occurring locally at the end of the stator core.

4 Claims, 5 Drawing Figures

COOLING MEDIUM BAFFLING DEVICE IN ROTARY ELECTRIC MACHINE

BACKGROUND OF THE INVENTION

This invention relates to a cooling medium baffling device comprising a baffle plate fixed to the inner peripheral edge of one end of the stator core of a rotary electric machine for baffling the flow of a cooling medium through the machine.

In a large-sized rotary electric machine, for example, a large-sized turbogenerator, its rotor and stator are cooled by a cooling medium such as gaseous hydrogen flowing through the machine. While the heat generated in the machine can be almost uniformly removed by the cooling medium flowing through the machine, the cooling medium is difficult to sufficiently flow through some special portions of the machine, for example, the internal and endmost portions of the laminated stator core and the insulated winding, giving rise to local generation of high temperatures which affect adversely the output of the machine. Especially, eddy current loss occurs at the endmost area of the laminated stator core due to the leakage flux produced by the stator and rotor windings, and a very high temperature appears in the endmost area of the stator core. In the rotary electric machine, special parts constituting a cooling medium baffling device described later are mounted at this area of the stator core. The interrelation between this cooling medium baffling device and the stator winding provides an unbalance in the heat generated in this area tending to produce local high temperature portions. The present invention contemplates the prevention of such local generation of excessive heat in the endmost area of the stator core, in the rotary electric machine.

Before describing the phenomenon of local generation of excessive heat, a cooling system employed generally in a rotary electric machine such as a turbogenerator will be briefly described with reference to FIG. 1. FIG. 1 is a schematic longitudinal sectional view of such a rotary electric machine which includes a rotor 20, a stator 21 and a cooler 1. Referring to FIG. 1, a cooling medium supplied from the cooler 1 flows in the direction shown by the arrow to be forcedly fed into the machine by a fan 2 mounted adjacent one end of the rotor shaft of the machine. The cooling medium forcedly fed into the machine is divided into two portions $Q_a$ and $Q_b$ in the zone adjacent the ends 3 of the coils of the stator winding. The cooling medium portion $Q_a$ passes through the gap 4 between the rotor 20 and the stator 21 to cool the stator core 5 and flows then into discharge ports 6 disposed in the radially outer part of the stator 21. The other cooling medium portion $Q_b$ passes behind the coil ends 3 of the stator winding into supply ports 7 and then flows through the radially outer part of the stator 21 toward the gap 4 between the rotor 20 and the stator 21 for cooling the stator core 5. The cooling medium portion $Q_b$ flows then in the axial direction through the gap 4 to be directed toward the stator core 5 again from the gap 4, and after cooling the stator core 5, it is discharged into the discharge ports 6 disposed in the radially outer part of the stator 21. These cooling medium portions $Q_a$ and $Q_b$ are then led into the cooler 1, and after being cooled, the cooling medium is again forcedly fed into the machine by the fan 2.

The a large amount of cooling medium portion $Q_a$ branched in the zone adjacent the coil ends 3 of the stator winding is not required, and such an amount which is enough to cool the axial end area of the stator core 5 is merely required. Thus, the other cooling medium portion $Q_b$ branched in the zone adjacent the coil ends 3 of the stator winding occupies the greater part of the cooling medium. A baffle plate 12 as shown in FIG. 2 is therefore commonly provided at the inner peripheral edge of the axial end of the stator core 5 to regulate the flow rates of the cooling medium portions $Q_a$ and $Q_b$.

FIG. 2 is a schematic enlarged view of the end portion of the stator core 5. Referring to FIG. 2, the stator core 5 is provided with end ducts 8 of non-magnetic material and is tightly fastened and supported by a pair of end plates 9 of non-magnetic material although only one of such end plates 9 is shown. A retaining ring 11 is provided to protect the coil ends of the field winding received in the slots of the rotor body 10.

The baffle plate 12 provided for regulating the flow rates of the cooling medium portions $Q_a$ and $Q_b$ is generally made of a non-magnetic material and is fastened and secured by mounting bolts 14 to radially inner end extensions 13 of the end ducts 8. The flow rate of the cooling medium portion $Q_a$ can be regulated by adjusting the gap g between the baffle plate 12 and the retaining ring 11.

Complex magnetic flux is produced by the field winding or stator winding in the vicinity of the stator core end at which the baffle plate 12 is provided. Thus, eddy current loss occurs at the stator core end to generate a temperature higher than that at the axially middle portion of the stator core 5. Further, as a result of the increase in the output coefficient and ampere-conductors due to the recent tendency toward the increase in the capacity of the rotary electric machine of this kind, the leakage flux at the stator core end increases to such an extent that the temperature at this portion rises up to about a critical limit. Furthermore, due to the fact that the winding of double-layer and short-pitch arrangement is generally employed in the rotary electric machine of this kind, the phase of current flowing through one of the coils in one of the slots may differ from that of current flowing through the other in the same slot, or the phase of current flowing through one of the coils in one of the slots may differ from that of current flowing through another in the adjoining slot. In the vicinity of the boundary between the different modes of phase currents, therefore, the amount of leakage flux increases to increase the eddy current loss, with the result that a greatest temperature rise occurs at a point along the circumference of the stator core end.

FIG. 3 shows the circumferential positions of the mounting bolts 14 relative to those of the boundaries between the different modes of phase currents in the coils 15 of the stator winding. FIG. 3 also shows, by the curve A, the result of measurement of temperature rise in the vicinity of the radially outer ends of the teeth along the circumference of the end of the stator core. The axial end face of the stator core 5 is cooled by the cooling medium Q flowing in the direction shown by the arrow in FIG. 3.

In a prior art baffling device, the mounting bolts 14 for mounting the baffle plate 12 are circumferentially disposed at suitable intervals without regard to the phase of current flowing through the stator coils 15. These bolts 14 act to decrease the flow rate of the cooling medium Q at corresponding portions of the end face of the stator core, and therefore, temperature rise at these portions of the ends 3 of the stator coils 15 is slightly greater than that in the other portions as seen in FIG. 3. Further, as described hereinbefore, employment of the winding of double-layer and short-pitch arrangement in the rotary electric machine of this kind leads to the difference in the phase of current flowing through the coils in the same slot and also in the adjacent slots. As a result, the amount of leakage flux increases to increase the eddy current loss, and peaks of temperature rise appear at circumferential positions $t_1$ and $t_2$ as shown in FIG. 3.

These circumferential positions $t_1$ and $t_2$ represent the boundary positions on opposite sides of which the stator coils 15 inserted in the slots 16 of the stator core 5 have different phase currents. Suppose, for example, that the stator coils 15 inserted in the slots 16 of the stator core 5 are arranged to have U-phase, V-phase and W-phase as shown by the symbols ▨, ▢ and ▨ in FIG. 3 respectively.

Then, on the left-hand side of the circumferential position $t_1$, current of V-phase flows through both the upper and lower stator coils 15a and 15b, while on the right-hand side of this circumferential position $t_1$, currents of V-phase and W-phase flow through the upper and lower stator coils 15a and 15b respectively. Thus, different current modes appear in the slots 16 on opposite sides of the boundary represented by the circumferential position $t_1$. Similarly, different current modes appear on opposite sides of the circumferential position $t_2$. These boundaries of different current modes are present in a relation spaced by some distance in the circumferential direction of the stator core end.

In the prior art baffling device, however, the temperature rise due to the restriction of the flow of the cooling medium Q by the mounting bolt 14 overlaps the temperature rise at the circumferential position $t_1$ thereby giving rise to an extremely great temperature rise at the circumferential position $t_2$ as shown in FIG. 3, due to the fact that the mounting bolts 14 are disposed at the circumferential positions which have no regard to the phase of current flowing through the stator coils 15. Thus, a point of very high temperature appears at which the temperature is higher than the critical level which is almost reached at the stator core end due to the increase in the leakage flux. Such a temperature rise may give rise to troubles such as destruction of the insulation of the stator winding portion and burn of the stator core end face portion in the vicinity of the point of very high temperature, which obstruct the normal operation of the rotary electric machine.

SUMMARY OF THE INVENTION

It is a primary object of the present invention to provide an improved cooling medium baffling device in a rotary electric machine, which can level down the excessive temperature rise at the stator core end of the machine thereby eliminating the point of greatest temperature rise in the temperature rise distribution in the circumferential direction of the stator core end.

The present invention is based on the experimental finding that the point of greatest temperature rise at the stator core end appears at the point at which the circumferential position of the baffle plate mounting bolt registers with the circumferential position defining the boundary between the different modes of phase currents flowing through the coils received in the slots of the stator core. Based on the above finding, the present invention is featured by the fact that the circumferential position of the baffle plate mounting bolt is displaced from the circumferential position defining the boundary between the different modes of phase current flowing through the stator coils.

DESCRIPTION OF THE PREFERRED EMBODIMENT

A preferred embodiment of the present invention will now be described with reference to FIGS. 4 and 5.

Figure 5:
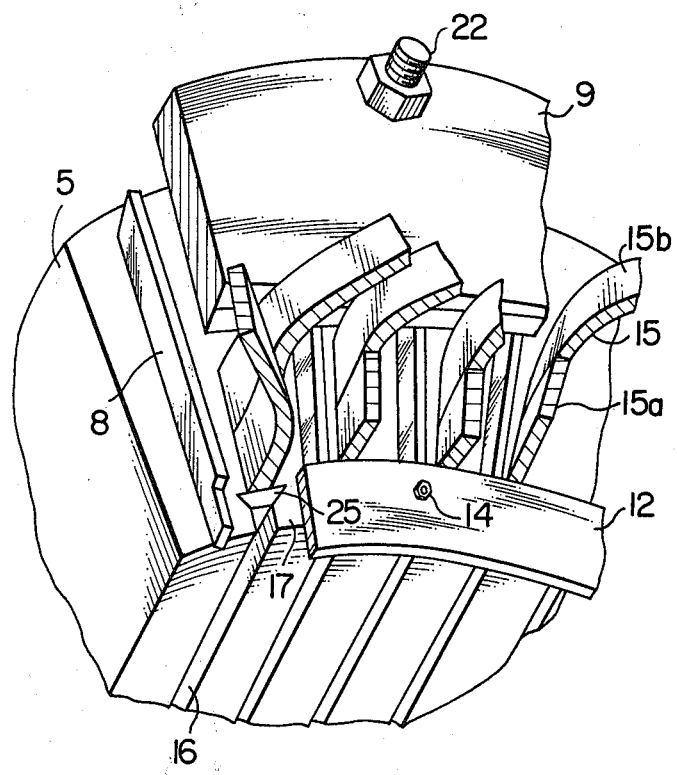
FIG. 5 is a partly cut-away enlarged perspective view of part of the stator provided with the baffling device according to the present invention.

FIG. 5 shows, in partly cut-away perspective fashion, part of a stator of a rotary electric machine including a stator core 5 and a stator winding 15. The stator core 5 is formed from laminated steel sheets and is engaged by a pair of end plates 9 at both ends. The stator core 5 and the end plates 9 are fastened as a unit by bolts 22. Although not shown in FIG. 5, a stator frame is disposed around the stator core 5 to fixedly support the stator core 5 therein by key means. Slots 16 extend axially along the inner periphery of the stator core 5 to receive stator coils 15 therein, with the coil ends 3 protruding as shown. A pair such stator coils 15 or an upper coil 15a and a lower coil 15b formed by juxtaposing a plurality of element conductors are received in each slot 16. The upper and lower coils 15a and 15b are received in the slot 16 in superposed relation and is fixed in position in the stator core 5 by a wedge 25.

End ducts 8 are provided on the teeth 17 defined between the adjoining slots 16, and a baffle plate 12 is mounted on the radially inner end extensions of the end ducts 8 by mounting bolts 14. The baffle plate 12 may be an annular member of non-magnetic material. Generally, however, the baffle plate 12 is formed from a plurality of segments of non-magnetic material for conveniences of assembling and disassembling and from the viewpoint of economy.

Figure 1:
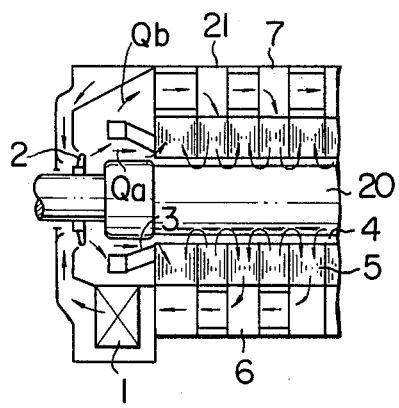
FIG. 1 is a schematic longitudinal sectional view showing a cooling system in a turbogenerator.
Figure 2:
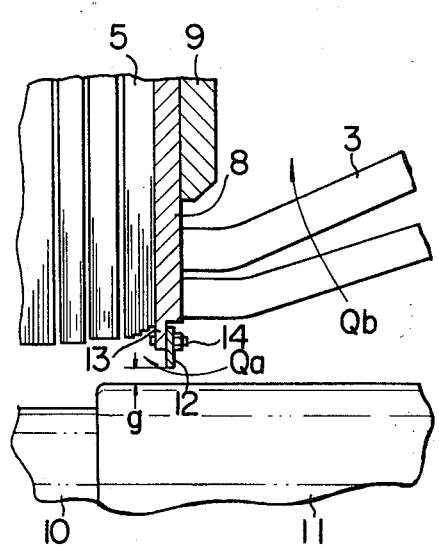
FIG. 2 is a schematic enlarged view of part of the machine in the vicinity of the end of the stator core in FIG. 1.
Figure 3:
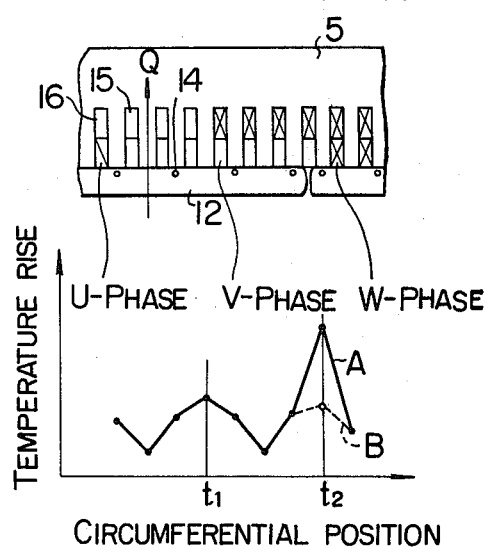
FIG. 3 is a diagrammatic view showing the relation between the circumferential positions of the baffle plate mounting bolts in a prior art cooling medium baffling device and the circumferential positions of the boundaries between the different modes of phase currents in the stator coils, and also showing the temperature rise distribution in the circumferential direction of the stator core end.
Figure 4:
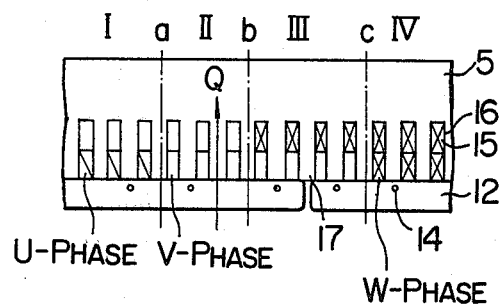
FIG. 4 is a view similar to FIG. 3, but showing the relation between the circumferential positions of the baffle plate mounting bolts and the circumferential positions of the boundaries between the different modes of phase current in the stator coils, in an embodiment of the present invention.

FIG. 4 shows the relation between the position of the baffle plate mounting bolts 14 and the phase current in the upper and lower stator coils 15a and 15b. Referring to FIG. 4, the coils 15a and 15b are divided into groups I, II, III and IV, and circumferential positions a, b and c provide the boundaries therebetween respectively. It will be seen in FIG. 4 that the baffle plate mounting bolts 14 are disposed at positions displaced suitably from these circumferential positions a, b and c. Thus, the cooling medium Q for cooling the stator core end can flow toward the stator core end without the possibility of reduction in its flow rate at the circumferential positions a, b and c corresponding to the boundaries between the different modes of phase currents in the stator coils 15. Therefore, the heat generated due to the excessive eddy current loss occurring at these circumferential positions a, b and c can be effectively removed, and the point of greatest temperature rise along the circumference of the stator core and can be eliminated as shown by the curve B in FIG. 3.

It will be understood from the foregoing description of the present invention that the point of greatest temperature rise along the circumference of the stator core end can be eliminated to obviate troubles such as heat-affected destruction of the insulation of the stator winding and burn of the stator core, thereby ensuring safe-end continuous operation of the rotary electric machine.

We claim:

1. In a rotary electric machine including a stator core and a stator winding received in slots of said stator core, a cooling medium baffling device comprising a cooling medium baffle plate fixed to the inner peripheral edge of one end of said stator core by mounting means protruding axially from the end of said stator core, said mounting means being located only at circumferential positions other than positions defining a boundary between the different modes of phase currents flowing through the coils constituting said stator winding.

2. In a rotary electric machine including a stator core, a stator winding received in slots of said stator core, and end ducts disposed at one end of said stator core in a relation spaced apart from each other by a predetermined distance in a circumferential direction of said stator core end, a cooling medium baffling device comprising a cooling medium baffle plate fixed to said end ducts by circumferentially disposed mounting bolts, each of said mounting bolts being located only at circumferential positions other than positions defining a boundary between different modes of phase currents flowing through the coils constituting said stator winding.

3. A rotary electric machine comprising:
   a stator core formed of a plurality of sheets and a plurality of slots extending axially along an inner periphery of said stator core;
   a stator winding including a plurality of coils received in said slots, said coils being divided into a U-phase, a V-phase and a W-phase group in accordance with a phase of current flowing therethrough, a respective group of coils being sequentially juxtaposed in a circumferential direction of said stator core;
   a cooling medium baffle means formed of a plurality of cooling medium baffle segments; and
   a plurality of mounting means protruding axially from each end of said stator core, said mounting means fixing each of said cooling medium baffle segments to an inner peripheral edge of each end of said stator core, said mounting means are disposed only at circumferential positions other than boundary positions between the respective different phase groups of coils.

4. A rotary electric machine according to claim 3, further comprising:
   end duct spacer means disposed at each end of said stator core in a relation spaced apart from each other by a predetermined distance in the circumferential direction of said stator core end.

* * * * *